3,002,843
CONCRETE STRUCTURE
Rudolf Stöcker, Am Waldsaum 55, Essen-Ruhr, Germany
No Drawing. Filed Oct. 1, 1957, Ser. No. 687,347
6 Claims. (Cl. 106—97)

The present invention relates to structural elements and more particularly it relates to concrete structures of high fire and radiation resistance.

For various applications including air raid shelters, shelters against atomic attack and in connection with nuclear reactors, there exists an urgent need for concrete structures which will protect against intense heat, very high temperatures and radiation.

It is desired that reinforced concrete structures and reinforced or not reinforced concrete structural elements should withstand temperatures of up to 1200° C. for prolonged periods of time without substantial impairment of their load capacity and strength. Concrete mixtures such as are customarily used in the construction of concrete structures and in the production of concrete structural elements, particularly reinforced concrete and prestressed concrete do not possess the desired resistance against the effect of high temperatures. Upon being exposed to such high temperatures, for instance due to conflagrations, loosening of the concrete structure occurs as well as heat softening of the reinforcements. Furthermore, particularly in the case of concrete containing relatively large size aggregate, chipping off and occasionally explosive cracking or breaking of concrete elements takes place already at temperatures of about 570° C. Even concrete elements produced with the most refractory natural stone, namely basalt, as aggregate cannot withstand temperatures exceeding 900° C., due to liquefaction and gas discharge.

It is therefore the object of the present invention to provide a concrete structure which will overcome the above described disadvantages.

It is the further object of the present invention to provide a concrete structure which will be resistant against heat up to 1200° C. even when exposed for prolonged periods of time.

It is another object of the present invention to provide a concrete structure which will be substantially impermeable to radiation caused by a nuclear blast.

It is yet another object of the present invention to provide a concrete structure which can be easily and economically produced and which will withstand prolonged exposure to extremely high temperatures as well as provide a shield against nuclear radiation.

Other objects and advantages of the present invention will become apparent from a further reading of the description and the appended claims.

With the above and other objects in view, the present invention mainly comprises a structural element having high fire resistance and being formed of a concrete mixture consisting essentially of about 600 parts by weight of blast furnace slag and 150 parts by weight of Portland cement. The quantities (weights) are to be understood relatively.

According to the present invention foamed and/or unfoamed slag, preferably blast furnace slag of suitable particle sizes is used as concrete aggregate and is mixed with finely ground cement, preferably Portland cement in such quantitative relationship that the resulting concrete will include a larger percentage of tricalcium silicate than the percentage contained in conventional blast furnace cement. The product according to the present invention will also have very high initial strength as binder for the production of fire resistant load carrying reinforced or not reinforced structural elements. According to a preferred embodiment of the present invention, the concrete mixture consisting essentially of blast furnace slag and Portland cement contains per cubic meter of the finished concrete structural element between 270 and 500 kg. of Portland cement. In addition, small quantities of finely ground blast furnace slag, air entraining agents and other conventional concrete additives may be included.

Conventional Portland cement has about the following composition:

|  | Percent |
|---|---|
| ($SiO_2$) | 19–25 |
| ($Al_2O_3+TiO_2$) | 4–9 |
| ($Fe_2O_3FeO$) | 1.6–6 |
| ($MnO$) | 0.0–0.5 |
| ($MgO$) | 0.6–3 |
| ($SO_3$) | 1–3 |
| ($CaO$) | 60–70 |

The CaO content and consequently the content of tricalcium silicate of the cement used according to the present invention is thus between about 12% and 17% higher than in the case of conventional blast furnace cement. Preferably, according to the present invention high quality Portland cement is used such as is for instance identified according to the German DIN–Norm 1164 as Portland cement 325 or 425.

The concrete structure produced according to the present invention of foamed or unfoamed slag, preferably blast furnace slag such as blast furnace pumice stone or blast furnace slag fines with the addition of Portland cement or other cements having a high content of tricalcium silicate, possesses a surprisingly high fire resistance. Furthermore, the concrete structure according to the present invention is an extremely poor heat conductor so that high temperatures to which the concrete structure is exposed will not penetrate and will not attack the reinforcing iron. It has also been found that such concrete structures according to the present invention can be exposed to very high temperatures for prolonged periods of time without being adversely affected. For instance, tension cracks are not formed even when high temperatures act on the outside of the concrete structure while the core of the structure or portions thereof facing away from the source of heat are still cold due to the very low heat conductivity of the structure.

Furthermore, the fire resistant concrete structures according to the present invention are not subject to changes in their crystalline structure within temperature ranges up to 1200° C. This fact is of importance since changes in the crystalline structure lead to sudden heat elongations and might lead in the case of heavy concrete to crack formation. Upon exposure for a short period of time to even higher temperatures such as 3000° C. or considerably higher, i.e., at temperatures which occur in the case of nuclear explosions, concrete structures according to the present invention show only surface glazing.

It is also possible and within the scope of the present invention to completely cover load carrying iron or steel structures with the above described heat resistant concrete, or to cover structures consisting of heavy concrete cores of conventional concrete with casings of sufficient thickness made of concrete in accordance with the present invention, whereby these casings represent insulated coverings which prevent excessively high temperatures from reaching the concrete core of the structure, while simultaneously also acting as load carrying structural elements. According to another embodiment according to the present invention, heat breakers consisting of structural elements according to the present invention are arranged in front of entrances to air raid shelters or the like and these protective walls consisting of structural elements according to the present invention will serve in case of conflagrations to absorb heat and thus prevent extreme temperatures from reaching the shelter. It is also within the scope of the present invention to provide shapes with or without reinforcements and consisting of the above described concrete mixtures, particularly for use as building element or wall covering of shelters above surface, underground shelters, etc. Furthermore, by covering both faces of wire nettings, wire mesh or the like with concrete layers according to the present invention it is possible to produce a nailable light-weight fire apron having a thickness of only about 20 mm. In this manner, plate-shaped elements can be produced which are useful as fire resistant coverings, coverings for the doors of air raid shelters, separating walls and the like.

According to a preferred embodiment of the present invention, the fire resistant concrete structures are formed in such a manner that the same will simultaneously also offer protection against nuclear radiation. This is achieved by embodying in the concrete mixture boron, preferably in the form of boron carbide since boron carbide does not impair the strength of the concrete. It has been found advantageous, depending on the thickness of the intended concrete structure to include in the concrete mixture boron carbide in a quantity ranging from about 0.1% to about 3% of the entire concrete mixture.

Thus, according to the present invention, concrete structures are provided which combine the strength properties of conventional reinforced concrete with resistance against the high temperatures occurring in the case of atomic explosions and with great impermeability for the radiation produced by nuclear explosions. Thus, structures built according to the present invention offer a higher degree of protection in case of atomic attack. Furthermore, concrete structures according to the present invention are also useful in the peace time protection against radiation such as is for instance required in atomic power stations since the nuclear reactor may be operated at high temperatures when structural elements according to the present invention are used, than in the case of heavy concrete (gravel concrete) structures.

Concrete structures according to the present invention and containing 1% by weight of boron carbide show an excellent shielding effect. In a thickness of 24 cm. such structures will be penetrated only by $\frac{1}{1000}$ of the slow neutrons, in a thickness of 90 cm. by $\frac{1}{1000}$ of the fast neutrons and in a thickness of 95 cm. by only $\frac{1}{1000}$ of the hard gamma rays to which one face of the structure is exposed. The required concentration of the boron addition in the concrete structure depends on the intended thickness of the concrete wall or building.

The following examples are given as illustrative only of the present invention, the invention, however, not being limited to the specific details of the examples. The quantities (weights) are to be understood relatively.

*Example I*

A highly fire resistant concrete ceiling is produced from the following concrete mixture:

300 kg. unfoamed blast furnace slag, particle size 0–4 mm.
300 kg. foamed blast furnace slag, particle size 3–12 mm.
16 kg. finely ground blast furnace slag
750 grams calcium chloride
150 kg. Portland cement 225

*Example II*

A concrete ceiling according to the present invention is formed of the following concrete mixture:

300 kg. unfoamed blast furnace slag, particle size 0–4 mm.
175 kg. unfoamed blast furnace slag, particle size 3–7 mm.
125 kg. unfoamed blast furnace slag, particle size 7–15 mm.
16 kg. finely ground blast furnace slag
750 grams calcium chloride
150 kg. Portland cement 225

*Example III*

Structural elements for use in nuclear reactors are produced of the following concrete mixture:

200 kg. blast furnace slag, particle size 0–4 mm.
150 kg. blast furnace slag, particle size 3–7 mm.
150 kg. blast furnace slag, particle size 7–15 mm.
100 kg. blast furnace slag, particle size 15–35 mm.
15 kg. finely ground blast furnace slag
150 kg. Portland cement. 225

The compression strength of this concrete element which originally amounts to 400 kg./cm.$^2$, drops to ca 200 kg./cm.$^2$ upon heat equalization after 72 hours positioning on a hot plate having a temperature of 1000° C. No further drop in compression strength does occur.

*Example IV*

A fire apron is produced according to the present invention by completely covering a reinforcing metal mesh with concrete of the composition described below so as to form a reinforced plate of about 20 mm. thickness.

600 kg. granulated blast furnace slag sand
200 kg. Portland cement 225
300 grams of a commercial air entraining agent The thus produced fire apron upon being heated at one side to 1000° C. shows at the opposite side after heat equalization a constant temperature of ca 200° C.

*Example V*

A concrete structure adapted to protect against radiation is formed of the following concrete mixture:

300 kg. blast furnace slag, particle size 0–4 mm.
300 kg. blast furnace slag, particle size 0–25 mm.
150 kg. Portland cement 225.
8 kg. finely ground quartz
8 kg. boron carbide Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A structural element capable of resisting temperatures of at least 1200° C. without change in crystalline structure and being formed of a mixture consisting essentially of about 150 parts by weight of Portland cement, up to one part by weight of calcium chloride and about 615 parts by weight of at least one substance selected from the group consisting of foamed and unfoamed blast furnace slag, about 300 parts by weight of said substance having a particle size of between 0 and 4 mm., about 300 parts by weight of said substance having a particle size of between 3 and 12 mm. and about 15 parts by weight of said substance being finely ground.

2. A structural element capable of resisting temperatures of at least 1200° C. without change in crystalline structure and being formed of a mixture consisting essentially of about 150 parts by weight of Portland cement, up to one part by weight of calcium chloride and about 615 parts by weight of at least one substance selected from the group consisting of foamed and unfoamed blast furnace slag, about 300 parts by weight of said substance having a particle size of between 0 and 4 mm., about 175 parts by weight of said substance having a particle size of between 3 and 7 mm., about 125 parts by weight having a particle size of between 7 and 15 mm. and about 15 parts by weight of said substance being finely ground.

3. A structural element capable of resisting temperatures of at least 1200° C. without change in crystalline structure and being formed of a mixture consisting essentially of about 150 parts by weight of Portland cement, up to one part by weight of calcium chloride and about 615 parts by weight of at least one substance selected from the group consisting of foamed and unfoamed blast furnace slag, about 200 parts by weight of said substance having a particle size of between 0 and 4 mm., and about 150 parts by weight having a particle size of between 3 and 7 mm. about 150 parts by weight having a particle size of between 7 and 15 mm., about 100 parts by weight having a particle size of between 15 and 35 mm. and about 15 parts by weight of said substance being finely ground.

4. The structural element of claim 1 containing 0.1 to 3% by weight of boron carbide as a radiation shielding agent.

5. The structural element of claim 2 containing 0.1 to 3% by weight of boron carbide as a radiation shielding agent.

6. The structural element of claim 3 containing 0.1 to 3% by weight of boron carbide as a radiation shielding agent.

References Cited in the file of this patent
UNITED STATES PATENTS

| | | |
|---|---|---|
| 1,867,641 | Witty | July 19, 1932 |
| 2,661,575 | Kennedy | Dec. 8, 1953 |
| 2,693,666 | Hutteman | Nov. 9, 1954 |
| 2,721,805 | Burke | Oct. 25, 1955 |
| 2,726,339 | Borst | Dec. 6, 1955 |
| 2,796,411 | Zirkle | June 18, 1957 |

OTHER REFERENCES

Encyclopedia of Chemical Technology, The Interscience Encyclopedia, Inc., N.Y., vol. 3 (1949), pages 429, 430, 489, 490, 492.